US010396858B2

(12) United States Patent
Greene

(10) Patent No.: US 10,396,858 B2
(45) Date of Patent: Aug. 27, 2019

(54) BI-STABLE DISPLAY TAG

(71) Applicant: Powercast Corporation, Pittsburgh, PA (US)

(72) Inventor: Charles E. Greene, Cabot, PA (US)

(73) Assignee: Powercast Corporation, Pittsburgh, PA (US)

( * ) Notice: Subject to any disclaimer, the term of this patent is extended or adjusted under 35 U.S.C. 154(b) by 106 days.

(21) Appl. No.: 14/524,689

(22) Filed: Oct. 27, 2014

(65) Prior Publication Data

US 2015/0116296 A1 Apr. 30, 2015

Related U.S. Application Data

(60) Provisional application No. 61/895,833, filed on Oct. 25, 2013.

(51) Int. Cl.
*G09G 3/20* (2006.01)
*H04B 5/00* (2006.01)
*H02J 50/12* (2016.01)
*H02J 5/00* (2016.01)
*H02J 7/02* (2016.01)
(Continued)

(52) U.S. Cl.
CPC .......... *H04B 5/0037* (2013.01); *G06F 3/14* (2013.01); *H02J 5/005* (2013.01); *H02J 7/025* (2013.01); *H02J 50/12* (2016.02); *H04B 5/0031* (2013.01); *H04B 5/0068* (2013.01); *H04B 5/0075* (2013.01); *G09G 2330/02* (2013.01); *G09G 2370/16* (2013.01); *G09G 2380/04* (2013.01); *H02J 7/34* (2013.01)

(58) Field of Classification Search
CPC .. G09G 3/20; G09G 2370/16; G09G 2380/04; G09G 2330/02
See application file for complete search history.

(56) References Cited

U.S. PATENT DOCUMENTS 5,412,192 A * 5/1995 Hoss ................ G06K 19/06187
235/380
6,504,580 B1 1/2003 Thompson et al.
(Continued)

OTHER PUBLICATIONS

Dementyev et al, "Wirelessly Powered Bistable Display Tags", ACM UbiComp '13, Sep. 8-12, 2013, pp. 383-386.*
(Continued)

*Primary Examiner* — Dorothy Harris
(74) *Attorney, Agent, or Firm* — Cooley LLP

(57) ABSTRACT

In some embodiments an apparatus includes a display module and a bi-stable display. The bi-stable display is operatively coupled to the display module and is configured to display a first image at a first time. The display module is configured to be operatively coupled to a wireless module and configured to be wirelessly powered by an external wireless power supply. The display module is configured to receive, at a second time after the first time and in response to a wireless interaction with a wireless device, (1) power from the external wireless power supply and (2) a signal from the wireless module indicative of a second image different from the first image. The bi-stable display is configured to display, in response to a signal indicative of an instruction from the display module, the second image at a third time after the second time.

13 Claims, 11 Drawing Sheets

(51) Int. Cl.
*G06F 3/14* (2006.01)
*H02J 7/34* (2006.01)

(56) References Cited

U.S. PATENT DOCUMENTS

| | | | | |
|---|---|---|---|---|
| 6,972,732 | B1* | 12/2005 | Nishikawa | G06F 3/1431 345/1.1 |
| 7,791,557 | B2 | 9/2010 | Mickle et al. | |
| 8,136,725 | B2* | 3/2012 | Yamazaki | G06K 19/0704 235/380 |
| 8,418,926 | B2* | 4/2013 | Chen | G06K 19/07703 235/487 |
| 8,827,889 | B2* | 9/2014 | Smith | A61M 1/127 600/16 |
| 2001/0054005 | A1* | 12/2001 | Hook | G06F 3/147 705/20 |
| 2006/0017659 | A1* | 1/2006 | Ogawa | B41J 3/4076 345/30 |
| 2009/0088077 | A1* | 4/2009 | Brown | H04B 5/02 455/41.2 |
| 2009/0207000 | A1* | 8/2009 | Mickle | G06K 19/0707 340/10.34 |
| 2010/0312692 | A1* | 12/2010 | Teicher | G06Q 20/10 705/39 |
| 2011/0050756 | A1* | 3/2011 | Cassidy | G09G 3/20 345/690 |
| 2011/0127953 | A1* | 6/2011 | Walley | G06K 7/10207 320/108 |
| 2011/0140841 | A1* | 6/2011 | Bona | G06K 19/06187 340/5.83 |
| 2011/0226859 | A1* | 9/2011 | Chen | G06K 19/07703 235/492 |
| 2011/0241843 | A1* | 10/2011 | Marsanne | G06F 3/1454 340/10.3 |
| 2011/0279242 | A1 | 11/2011 | Krawczewicz | |
| 2012/0286938 | A1* | 11/2012 | Cote | G06Q 10/08 340/10.6 |
| 2012/0293021 | A1* | 11/2012 | Teggatz | H02J 3/383 307/151 |
| 2012/0307472 | A1* | 12/2012 | Bohn | G06F 1/1616 361/807 |
| 2013/0012133 | A1* | 1/2013 | Liu | H04B 5/0031 455/41.3 |
| 2013/0099587 | A1* | 4/2013 | Lou | H01F 38/14 307/104 |
| 2013/0127687 | A1* | 5/2013 | Yu | H01M 10/44 345/1.1 |
| 2013/0234532 | A1 | 9/2013 | Fells et al. | |
| 2013/0237149 | A1* | 9/2013 | Stuart | G09F 9/372 455/41.1 |

OTHER PUBLICATIONS

Leavline et al, MREHS: Implementation of MPPT-based RF Energy Harvesting System for Electrical Appliances, Frontiers in Science 2012, 2(6), pp. 187-191.*

Le, Efficient Power Conversion Interface Circuits for Energy Harvesting Applications, Thesis submitted to Oregon State University, 2008, pp. 1-202.*

Park et al, Investigation of Adaptive Matching Methods for Near-Field Wireless Power Transfer, IEEE Transactions on Antennas and Propagation, vol. 59, No. 5, May 2011, pp. 1769-1773.*

Dementyev, et al., "Wirelessly Powered Bistable Display Tags", *UbiComp'13*, Sep. 8-12, 2013, Zurich, Switzerland.

International Search Report and Written Opinion dated Jan. 28, 2015 for PCT/US2014/062402.

* cited by examiner

BI-STABLE DISPLAY TAG

CROSS-REFERENCE TO RELATED APPLICATIONS

This application claims priority to and the benefit of U.S. Provisional Patent Application Ser. No. 61/895,833 entitled, "Battery-Free Bi-Stable Display Tag," filed Oct. 25, 2013, the disclosure of which is incorporated herein by reference in its entirety.

BACKGROUND

Some embodiments described herein relate generally to systems, methods and apparatus with bi-stable display tags.

Known systems exist for updating bi-stable displays. Such systems, however, can frequently use battery power, causing rapid depletion of onboard batteries and/or can use additional cabling to provide power to local switch and outlet controllers. Other systems can use a device requesting to update the bi-stable display to be paired or otherwise previously authorized by the bi-stable display. Alternatively, such a device can require authorization from a user of the bi-stable display for each update.

Thus, a need exists for improved systems, methods and apparatus for use and updating of bi-stable displays.

SUMMARY

In some embodiments an apparatus includes a display module and a bi-stable display. The bi-stable display is operatively coupled to the display module and is configured to display a first image at a first time. The display module is configured to be operatively coupled to a near-field communications (NFC) module and configured to be wirelessly powered by an external NFC power supply. The display module is configured to receive, at a second time after the first time and in response to a near-field interaction with an NFC device, (1) power from the external NFC power supply and (2) a signal from the NFC module indicative of a second image different from the first image. The bi-stable display is configured to display, in response to a signal indicative of an instruction from the display module, the second image at a third time after the second time.

DETAILED DESCRIPTION

Figure 1:
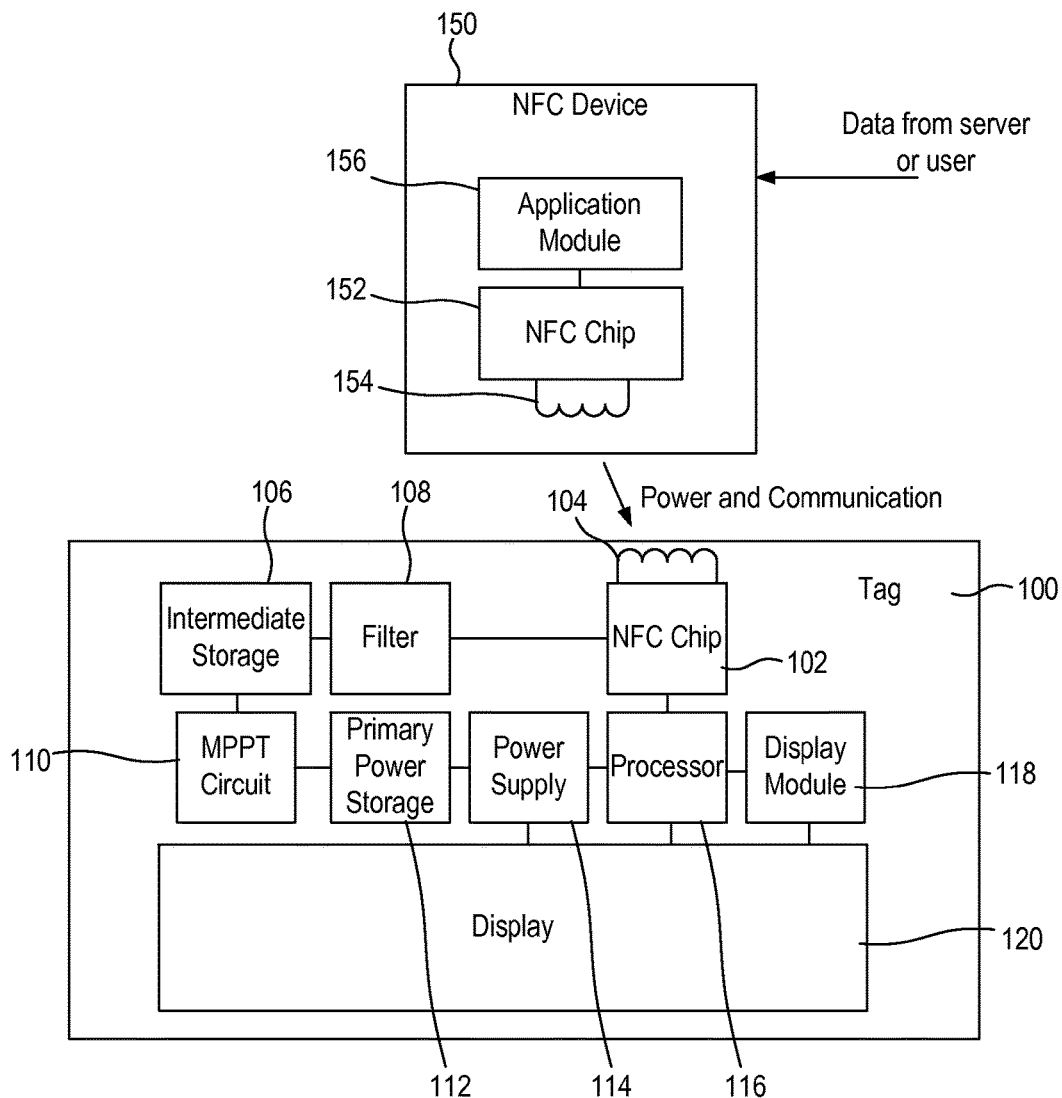
FIG. 1 is a schematic illustration of a display tag and NFC device according to an embodiment.

In some embodiments an apparatus includes a display module and a bi-stable display. The bi-stable display is operatively coupled to the display module and is configured to display a first image at a first time. The display module is configured to be operatively coupled to a near-field communications (NFC) module and configured to be wirelessly powered by an external NFC power supply. The display module is configured to receive, at a second time after the first time and in response to a near-field interaction with an NFC device, (1) power from the external NFC power supply and (2) a signal from the NFC module indicative of a second image different from the first image. The bi-stable display is configured to display, in response to a signal indicative of an instruction from the display module, the second image at a third time after the second time.

In some embodiments the apparatus further includes a power supply operatively coupled to a power storage. In such embodiments, the power supply is configured to begin supplying power to the bi-stable display from the power storage when the power storage voltage crosses a first threshold. In some embodiments, the apparatus further includes a first coil operatively coupled to the NFC module and a second coil operatively coupled to the display module via a power supply. In some embodiments, the apparatus further includes a coil and the NFC module. In such embodiments, (1) the coil is configured to receive power from the external NFC power supply, (2) the display module is configured to receive power from the coil via a filter and a power supply, and (3) the NFC module is configured to receive power from the coil without passing through the filter or the power supply. In some embodiments, the bi-stable display is a first bi-stable display, and the apparatus further includes a second bi-stable display configured to display the first image at the first time and the second image at the third time. In some embodiments, the apparatus further includes a flexible shell disposed about at least a portion of the bi-stable display. In such embodiments, the bi-stable display is operatively coupled to a central portion of the flexible shell, and a flex radius of the flexible shell being less than a flex radius of the bi-stable display.

In some embodiments, a method includes receiving, in response to a near-field interaction with a near-field communication (NFC) device, (1) power from an NFC power supply associated with the NFC device and (2) a display signal including an instruction to display an image. The method includes sending at least a portion of the power to a power supply via at least one power storage module, the power supply configured to selectively supply power to a bi-stable display and a display module. The method includes sending, to the display module and based on the display signal, an instruction configured to cause the bi-stable display to display the image.

In some embodiments the method further includes activating the bi-stable display after a voltage level of the power storage module crosses a threshold. In some such embodiments, the threshold is about 2.5 volts. In some embodiments, the method further includes measuring a temperature associated with the bi-stable display. In such embodiments, if the temperature is above a temperature threshold, the method further includes activating the bi-stable display after a voltage level of the power storage module crosses a first activation threshold. In such embodiments, if the temperature is below the temperature threshold, the method further includes activating the bi-stable display after the voltage level of the power storage module crosses a second activation threshold higher than the first activation threshold. In some embodiments, the method further includes sending, to the NFC device, a signal indicative of a verification that the display signal was received. In some embodiments, the method further includes, prior to sending the at least a portion of the power to the power supply, substantially fully charging the power supply such that the power supply is in a fully charged state and measuring a voltage value of the power supply in the fully charged state.

In some embodiments a method includes authorizing, by a first mobile device, a second mobile device to send, without an interaction from a user of the first mobile device, any display data defined on the second mobile device to a viewing device having a bi-stable display and via the first mobile device. The viewing device being paired with the first mobile device and not being paired with the second mobile device. The method includes receiving, by the first mobile device from the second mobile device, the display data to be displayed on the viewing device. The method includes receiving, by the first mobile device using a lower power wireless connection from the viewing device, a signal indicative of the presence of the viewing device. The method includes sending, from the first mobile device to the viewing device using a higher power wireless connection, the display data such that the bi-stable display displays an image representative of the display data.

In some embodiments, the lower power wireless connection is a Bluetooth® low energy connection. In some embodiments, the higher power wireless connection is one of a Classic Bluetooth® connection, a Wi-Fi® connection or a Cellular connection. In some embodiments, the method further includes, prior to sending the image, authenticating the viewing device. In some embodiments, authorizing the second mobile device is at a first time, and receiving the display data to be displayed includes receiving the display data without receiving, at a second time after the first time, an interaction from the user of the first mobile device.

In some embodiments, an apparatus includes a viewing device configured to be wirelessly coupled to a first mobile device, the viewing device including a bi-stable display. The viewing device configured to authenticate, via a lower-power wireless connection and in response to a request for an indication of a presence of the first mobile device, the first mobile device. The viewing device configured to receive, from the first mobile device using a higher-power wireless connection, an image that was (1) captured by an image sensor of a second mobile device and (2) previously received by the first mobile device, from the second mobile device, without an interaction from a user of the first mobile device. The viewing device is configured to display the image on the bi-stable display.

In some embodiments, the apparatus can further include at least one of a mounting magnet, an adhesive strip, a tether and a kickstand. In some embodiments, the apparatus further includes a supercapacitor configured to provide power to the bi-stable display. In some embodiments, the image further includes text.

In some embodiments, an apparatus includes a display module and a bi-stable display operatively coupled to the display module. The bi-stable display configured to display a first image at a first time. The display module is configured to be operatively coupled to a radio-frequency identification (RFID) module and configured to be wirelessly powered by an external RFID power supply. The display module is configured to receive, at a second time after the first time and in response to an RFID interaction with an RFID device, (1) power from the external RFID power supply and (2) a signal from the RFID module indicative of a second image different from the first image. The bi-stable display is configured to display, in response to a signal indicative of an instruction from the display module, the second image at a third time after the second time.

In some embodiments, the apparatus further includes a flexible shell disposed about at least a portion of the bi-stable display. In such embodiments, the bi-stable display is operatively coupled to a central portion of the flexible shell. In such embodiments, a flex radius of the flexible shell being less than a flex radius of the bi-stable display. In some embodiments, the apparatus further includes a sensor module configured to monitor a condition of the bi-stable display. In such embodiments, the condition is a temperature and the power supply is operatively coupled to a power storage. In such embodiments, if the temperature is above a temperature threshold, the display module is configured to activate the bi-stable display after a voltage level of the power storage module crosses a first activation threshold and if the temperature is below the temperature threshold, the display module is configured to activate the bi-stable display after the voltage level of the power storage module crosses a second activation threshold higher than the first activation threshold. In some embodiments, the apparatus further includes a radio frequency (RF) to direct current (DC) converter operatively coupled to an antenna. In some embodiments, the apparatus further includes an RFID chip operatively coupled to a first antenna and an RF harvester operatively coupled to a second antenna. In such embodiments, the second antenna isolated from the first antenna by a distance of about one quarter wavelength. In some embodiments, the apparatus further includes an RFID chip that includes a first RF-to-DC converter and an RF harvester that includes a second RF-to-DC converter. In such embodiments, the second RF-to-DC converter having a higher conversion efficiency than the first RF-to-DC converter.

Systems, apparatus and methods associated with bi-stable display tags can be used to continuously display information using little to no power, and can be used to update the displayed information. Specifically, systems, apparatus and methods associated with bi-stable display tags can use near-field communication (NFC) to transmit power and data between a display tag and a data/power source, can authorize and/or otherwise authenticate wired and wireless devices for communication with the display tag, and can display information based on communication with those devices. By way of example, a display tag can include a NFC chip, power storage, power supplies, display modules, etc. A display tag as described herein can be used for scenarios where continuous display and low power consumption are desired, for example, descriptive tags (price tags, luggage tags, etc.) and descriptive and/or personal displays (descriptive information associate with a nearby object, displaying pictures/photographs, etc.).

As used in this specification, the singular forms "a," "an" and "the" include plural referents unless the context clearly dictates otherwise. Thus, for example, the term "power supply" is intended to mean a power supply or a combination of power supplies.

FIG. 1 is a schematic illustration of a first embodiment of a display tag. As shown in FIG. 1, a display tag 100 includes an NFC chip 102 that includes a coil 104 (collectively "an NFC module"), an intermediate storage 106, a filter 108, a startup and maximum power point tracking (MPPT) circuit 110, a primary power storage 112, a power supply 114, a processor 116, a display module 118 and a bi-stable display 120 (display). Display tag 100 can be configured to have a near-field interaction with a NFC device 150, such as, for example, a wireless phone (e.g., a smartphone), tablet, etc. NFC device 150 includes an NFC chip 152 that includes a coil 154, which can be similar to NFC chip 102 and coil 104. NFC device 150 can be configured to act as an external power supply for display tag 100. As shown in FIG. 1, display tag 100 does not include a battery as a primary power source.

Display tag 100 includes NFC chip 102 that includes coil 104. NFC chip 102 is configured to provide both communications and power to display tag 100. Specifically, NFC 102 and coil 104 are configured to interact with NFC chip 152 and coil 154 of NFC device 150. NFC chip 150 also includes an application module 156 configured to execute an application that can modify an image displayed by display tag 100

In some instances data (e.g., an image, descriptive information, etc.) can be input to application 156 from a user of NFC device 150 or can be automatically downloaded after secure authentication with a remote server (not shown). In some instances, application 156 can automatically, or when prompted by the user, download the data to NFC chip 102 of display tag 100. In some instances, the data can be downloaded when the display tag 100 is detected by NFC device 150. In such instances, this download can be accomplished by tapping or contacting NFC device 150 against display tag 100. In some instances, the data can be stored in a non-volatile memory (not shown) of display tag 100. In this manner, data loss can be avoided during momentary or permanent loss of power to display tag 100 during an NFC interaction with NFC device 150. In some instances, application 156 can read back the data from the display tag 100 to confirm the data was properly stored. In some instances, display tag 100 can communicate back to NFC device 150 that the data has been successfully received and/or successfully written to bi-stable display 120. In some instances, the user may visually check the data on the bi-stable display 120 to ensure a proper display update has occurred. In some instances, application 156 can be configured to use a camera associated with NFC device 150 to view and confirm the image is correct.

In some instances, NFC device 150 and display tag 100 can be securely paired. In such instances, display tag 100 can provide a unique identification number to NFC device 150 at a time of pairing. The unique identification number can be used as a key or seed in an encryption algorithm. In some instances, display tag 100 can include an algorithm for converting data received from NFC device 150 into a compatible image format for display module 118 to provide to display 120. Such algorithms can be performed by processor 116. In some instances, data sent from NFC device 150 to display tag 100 can be a compressed image or an image generation file that can be smaller than a size of the image. In some instances, processor 116 can include an algorithm for bar code generation. In some instances, processor 116 can includes fonts for generating text on display 120.

NFC chip 102 can provide power to display tag 100. In some instances, the amount of power that can be harvested from the NFC interaction with NFC device 150 can depend on a load voltage and a load current (effective resistance of the load). In such an instance, to maximize an amount of harvested energy, the load (e.g., intermediate storage 106 and primary power storage 112) can be designed to provide maximum (or substantially maximum) power transfer. In such instances, this can be referred to as the maximum power point (MPP). MPPT circuit 110 can be configured to ensure the maximum amount of power is transferred during the NFC interaction charging of primary power storage 112 (e.g. super capacitor, ultra capacitor). In such instances, MPPT circuit 110 can ensure the maximum amount of power is transferred by driving the load voltage on NFC chip 102 and coil 104 towards a predetermined voltage such as 2V. MPPT circuit 110 can also be configured to monitor a load current. MPPT circuit 110 can charge primary power storage 112 from a state of zero volts to a voltage higher than the MPP voltage. Accordingly, MPPT circuit 110 can be a DC-to-DC converter, for example a buck, boost, or buck-boost converter. MPPT circuit 110 can use intermediate storage 106 (e.g. a capacitor) to hold energy.

In some instances, MPPT circuit 110 can include a comparator (not shown) monitoring a voltage of intermediate storage 106. The comparator can connect intermediate storage 106 to primary power storage 112 through a series inductor using a switch such as a metal-oxide-semiconductor field-effect transistor (MOSFET). In some instances, MPPT circuit 110 can include a flyback diode (not shown) connected from the series inductor to a circuit ground (not shown) to allow the inductor to continue to provide current when the switch is disconnected after the voltage on intermediate storage 106 falls to a voltage level below the hysteresis of the comparator (low trip point). In some instances, MPPT circuit 110 can turn the switch on 100% of the time once the voltage of primary power storage 112 reaches the high trip point of the comparator, which corresponds to approximately the MPP.

MPPT circuit 110 can allow NFC device 150 to communicate data to NFC chip 102 of display tag 100. In the absence of MPPT circuit 110, primary power storage 112 can provide a heavy load to NFC chip 102 and may not allow enough voltage within NFC chip 102 for operation of display tag 100 until primary power storage 112 reaches a particular charge level/voltage such as 1.8V. With MPPT circuit 110, however, the energy from the NFC chip 102 may only need to charge intermediate storage 106 to enable communications between NFC device 150 and display tag 100. In some instances, the capacitance of intermediate storage 106 can be at least an order of magnitude smaller than the capacitance of primary power storage 112. By way of example, intermediate storage 106 can be 1 mF and primary power storage 112 can be 330 mF.

Display tag 100 includes filter 108 disposed between MPPT circuit 110 and NFC chip 102. Filter 108 configured to limit an amount of switching noise that can be coupled back to NFC chip 102. Because switching noise can cause communication errors, by reducing such switching noise, filter 108 can reduce communication errors within display tag 100.

Display tag 100 includes power supply 114 that is operatively coupled to primary power storage 112. In some instances, power supply 114 can be a boost DC-DC converter configured to step a voltage up to processor 116, display module 118, and display 120. In some instances, power supply 114 can provide power at 3.3V. In some instances, power supply 114 can include a comparator that can enable power supply 114 once the voltage on primary power storage 112 reaches a threshold, ensuring primary power storage 112 has enough energy (joules) to power display tag 100 through a complete write operation (e.g., display a new image) to display 120. In some instances, the comparator output can be latched on and processor 116 can be used to reset the enable of power supply 114, which can effectively disable power supply 114 and terminate power to processor 114. By way of example, the comparator can enable power supply 114 when primary power storage 112 reaches 2.5V. In such instances, processor 116 can disable power supply 116 once the display write operation is completed, which can occur at 1.4V. The comparator can have a hysteresis to ensure proper and orderly shutdown of display tag 100 should the reset from processor 116 not occur before the minimum operational voltage of power supply 114 is reached. By way of example, the comparator can disable power supply 114 once the voltage reaches 1.0V even if processor 116 has not issued a reset.

Processor 116, when receiving power from power supply 114, can receive data from NFC chip 102. In some instances, processor 116 can receive the data using a serial protocol such as inter-integrated circuit (I2C) or Serial Peripheral Interface (SPI). Processor 116 can be configured to reformat, interpret, or otherwise process the data to generate the image data for communication to display module 118. In some embodiments, display module 118 can produce power supply voltage(s) for display 120. In some embodiments, processor 116 can include display module 118 and can directly interface with display 120. In such an embodiment, an additional power supply can be connected to primary power storage 114 for providing the supply voltage(s) to display 120.

In any of the embodiments and instances described herein, a display of a display tag can be affected by a temperature of the environment. The display can use more or less time to write or more or less voltage to write depending on the temperature of the display. Accordingly, in some embodiments, the display tag can include a circuit to monitor the temperature of the display tag, or a portion of the display tag, to ensure the display is properly written and that the image quality is acceptable. In some instances, the temperature monitoring circuit can run off of an intermediate storage element such that it can adjust the amount of energy stored in the primary power storage. As an example, at temperatures below room temperature, the display can take more time and thus more energy to write. The temperature monitoring circuit can be used to adjust the trip point (high threshold) of the comparator in the power supply to allow the power storage element to charge to a higher voltage to store extra energy to be used to run the tag the additional time due to the temperature below room temperature. The temperature monitoring circuit can also be used to adjust the trip point (high threshold) of the comparator to a lower value if the temperature is such that the display needs less energy to operate.

In any of the embodiments and instances described herein, over time, a primary power storage can experience a loss of capacity and/or an increase in equivalent series resistance (ESR). As an example, a super capacitor can lose one third of its capacitance over a ten year period when exposed to high temperatures. Additionally, a super capacitor can experience an increase of ESR of 3 times over a ten year period when exposed to high temperatures. Accordingly, in some embodiments, the display tag can include a circuit to monitor the capacitance and/or ESR of the super capacitor (i.e., the primary power storage) to ensure enough energy is stored in the primary power storage to successfully write the display. In some instances, the primary power storage monitoring circuit runs off of the intermediate storage element so it can adjust the amount of energy stored in the primary power storage element. The primary power storage monitoring circuit can be used to adjust the trip point (high threshold) of the comparator in the power supply to allow the primary power storage to charge to a higher voltage to store the proper amount of energy to be used to run the tag when accounting for loss in capacitance and energy loss due to the additional ESR. The primary power storage monitoring circuit can run a test at predetermined intervals to assess the capacitance or capacity and ESR of the primary power storage. As an example, the primary power storage monitoring circuit can partially or fully charge the primary power storage and partially or fully discharge the primary power storage into a load while monitoring the voltage and/or current from the primary power storage. This can be done, as an example, every one-hundred activations of the display tag. In some instances, an indicator can be displayed on the display tag to show the user that this test is being performed.

Figure 2:
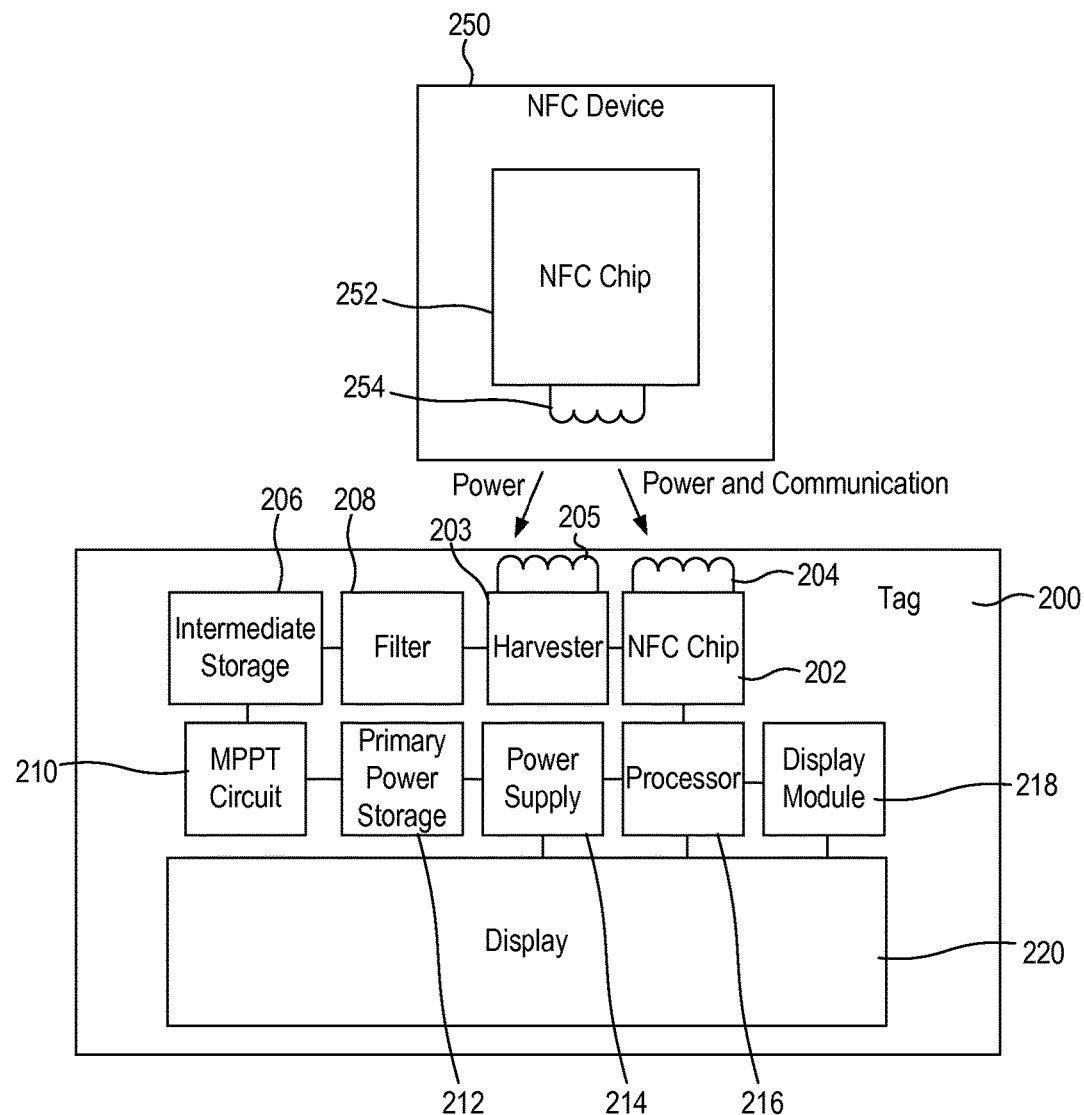
FIG. 2 is a schematic illustration of a display tag and NFC device according to an embodiment.

FIG. 2 is a schematic illustration of another embodiment of a display tag. As shown in FIG. 2, a display tag 200 includes an NFC chip 202 that includes a coil 204, an intermediate storage 206, a filter 208, an MPPT circuit 210, a primary power storage 212, a power supply 214, a processor 216, a display module 218 and a bi-stable display (display) 220. Display tag 200 can be configured to have a near-field interaction with a NFC device 250, such as, for example, a wireless phone (e.g., a smartphone), tablet, etc. NFC device 250 includes an NFC chip 252 that includes a coil 254, which can be similar to NFC chip 202 and coil 204. As show in FIG. 2, display tag 200 does not include a battery as the primary power source. Display tag 200 and NFC device 250 can be similar to and include similar components as display tag 100 and NFC device 150. By way of example, NFC chip 202 can be similar to NFC chip 102. Unlike display tag 100, display tag 200 additionally includes a harvester 203 that includes a coil 205.

Harvester 203 and coil 205 can receive power from NFC device 250 for use by display tag 200 in a similar manner as NFC chip 202 and coil 204. In this manner, harvester 203 and coil 205 can be used as the primary source of energy for display tag 200, and coil 204 can be used to power only NFC chip 202, and for communication to and from NFC device 250. By having coil 204 and coil 205 provide power to different elements of display tag 200, NFC chip 202 can be isolated and communication between NFC device 250 to NFC chip 202 can be improved. Furthermore, coil 205 can be configured to maximize (or substantially maximize) the amount of energy harvested from NFC device 250 without compromise to the NFC interactions. As an example, noise from MPPT circuit 210 can interfere with NFC interaction with NFC device 250. Furthermore, including coil 204 and coil 205 can isolate coil 204 from noise from MPPT circuit 210 from NFC chip 202. In some instances, harvester 203 can use highly efficient rectification methods rather than those deployable within a highly integrated NFC chip such as NFC chip 202. In some instances, coil 204 and coil 205 can have different sizes and may or may not be designed within the same planer space.

Figure 3:
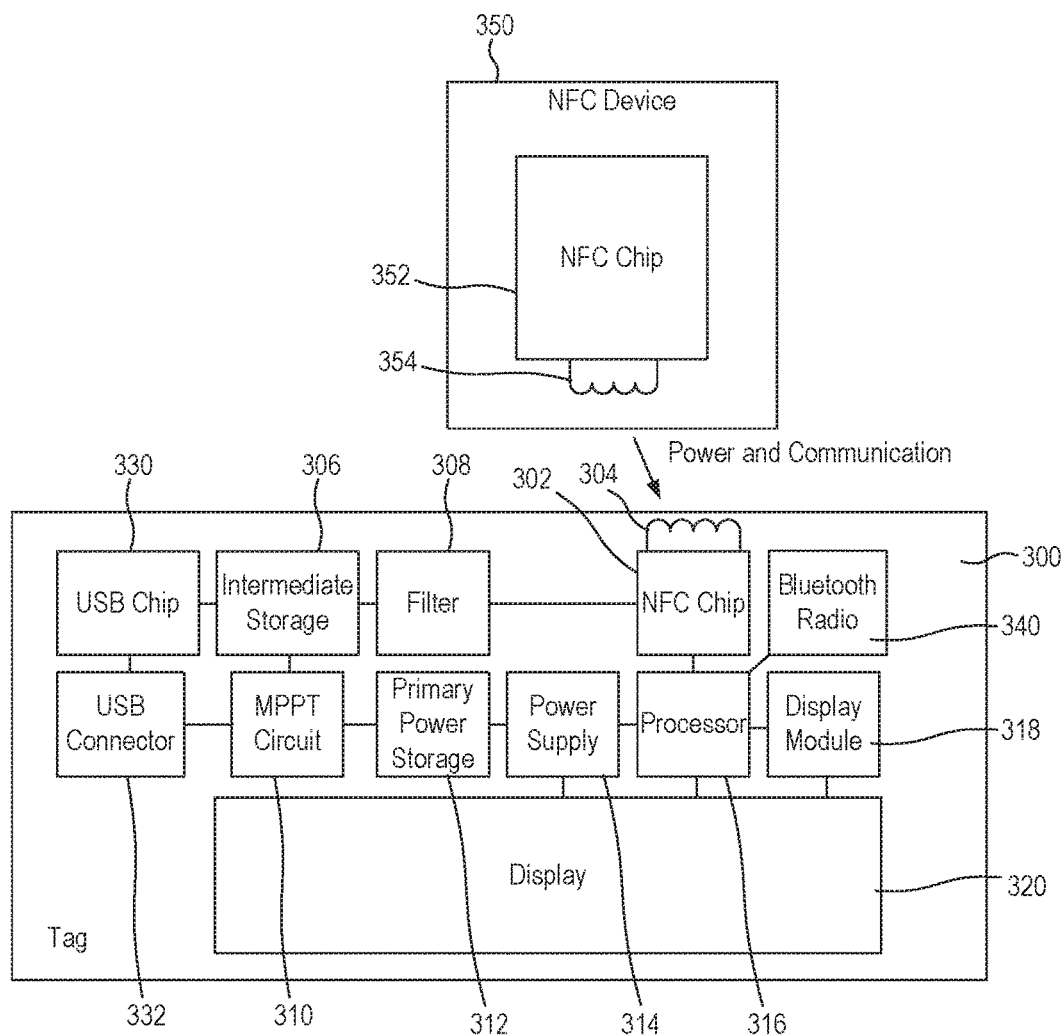
FIG. 3 is a schematic illustration of a display tag and NFC device according to an embodiment.

FIG. 3 is a schematic illustration of another embodiment of a display tag. As shown in FIG. 3, a display tag 300 includes an NFC chip 302 that includes a coil 304, an intermediate storage 306, a filter 308, an MPPT circuit 310, a primary power storage 312, a power supply 314, a processor 316, a display module 318 and a bi-stable display (display) 320. Display tag 300 can be configured to have a near-field interaction with a NFC device 350, such as, for example, a wireless phone (e.g., a smartphone), tablet, etc. NFC device 350 includes an NFC chip 352 that includes a coil 354, which can be similar to NFC chip 302 and coil 304. As show in FIG. 3, display tag 300 does not include a battery as the primary power source. Display tag 300 and NFC device 350 can be similar to and include similar components as display tags 100, 200 and NFC devices 150, 250. By way of example, NFC chip 302 can be similar to NFC chips 102, 202. Unlike display tag 100, display tag 300 additionally includes a universal serial bus (USB) chip 330, a USB connector 332, and a Bluetooth radio 340.

In some instances, it can be desirable for a display tag, such as display tag 300 to communicate with a device that cannot communicate via NFC. In such an instance, the device can communicate with display tag 300 via USB communications. In such an instance, a device configurable to run an application for updating display tag 300, such as standard PC or laptop, can communicate with display tag 300. In such an instance, the data used to define an image to display on display tag 300 could be communicated to display tag 300 via USB communication. In some instances, power for display tag 300 could be provided via USB connector 332. In such an instance, USB can provide more power than a NFC connection such that display tag 300 can charge primary power storage 314 faster with a USB connection or, alternatively, display tag 300 can have sufficient power from the USB connection and may not use primary power storage 314. In some instances, USB chip 330 can coordinate the additional power (for example, 5V versus 3V). In some instances, USB connector 332 on display tag 300 is a receptacle. In other instances, USB connector 332 can be a plug, extendable from display tag 300 to allow the USB connector 332 to be contained within display tag 300 when display tag 300 does not use a USB connection. Additionally, having a retractable USB connector 332 can reduce the probability of damage to USB connector 332. In some embodiments, such as that shown in FIG. 3, display tag 300 can have both NFC and USB or solely USB.

In any of the embodiments and instances described herein, an NFC chip can be used to communicate the data to display tag as described, and the data can be stored in non-volatile memory. Subsequently, a user can then plug the display tag into any USB port. The USB power can be used to charge up a capacitor (e.g., primary power storage) within the display tag which can be used to power the tag. In some embodiments, a display tag may not include any circuitry or chips for communication with the USB port to coordinate additional power above the minimum provided by the USB port.

In some embodiments, a display tag can only include a USB connection, e.g., a display tag may not include an NFC chip and coil. Such an embodiment can provide the ability to eliminate the primary power storage (e.g., super capacitor) and cost associated therewith. In such an embodiment, a USB chip can coordinate enough power with a PC or other USB-providing device to directly drive the peak current of the display tag. In some embodiments, a display tag can include a Bluetooth® or Wi-Fi® radio for communication to a device (see, e.g., Bluetooth radio 340 of display tag 300 in FIG. 3). In such embodiments, the Bluetooth® or Wi-Fi® radio can be powered by a power supply, directly or via a processor, and/or directly from an NFC chip and/or harvester.

Figure 4A:
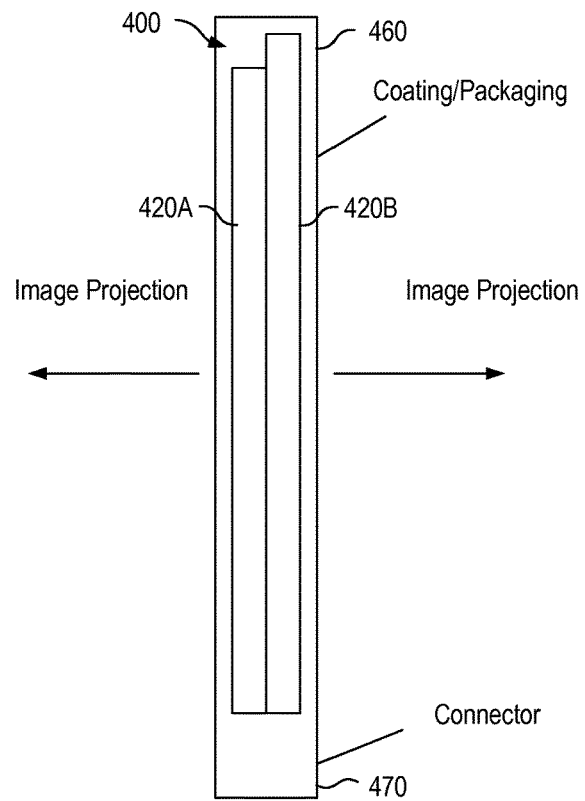
FIG. 4A is an illustration of a side view of a display tag according to an embodiment.
Figure 4B:
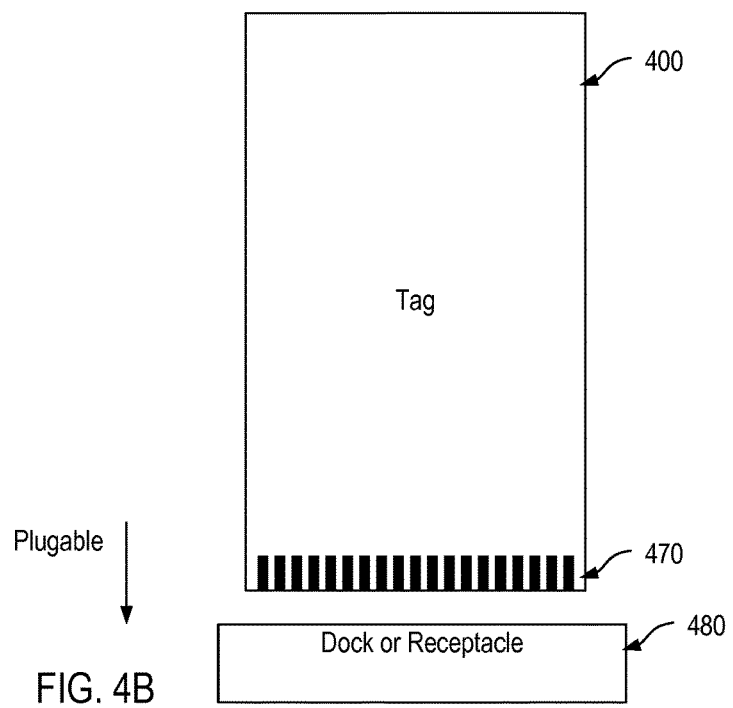
FIG. 4B is an illustration of a front view of the display tag shown in FIG. 4A.

FIGS. 4A and 4B are illustrations of another embodiment of a display tag. As shown in FIG. 4A, a display tag 400 includes a first bi-stable display (first display) 420A and a second bi-stable display (second display) 420B. As shown in FIG. 4A, first display 420A can face in a particular direction while second display 420B can face in a direction 180 degrees with respect to the direction of first display 420A (e.g., back to back). In some instances first display 420A and second display 420B can have different sizes and can display different content. First display 420A and second display 420B can be sandwiched within a coating or packaging material (shell) 460. In some instances, first display 420A, second display 420B, and/or shell 460 can be flexible. In some instances, display tag 400 can have an edge type or retractable connector (connector) 470 for connection to a dock or receptacle (dock) 480. In some embodiments, display tag 400 can have a flexible circuit board (not shown) for connecting one or both of first display 420A and second display 420B to connector 470. In some instances, the flexible circuit board can be 0.01 inches thick or less. In some instances, display tag 400 includes no other electronics except the first display 420A and second display 420B and integrated circuitry (NFC chip, primary power storage, etc.). In some instances, circuitry necessary to update the display, as described herein, can be integrated with dock 480. In some instances, dock 480 can configured to write to more than one display tag sequentially or simultaneously.

Figure 5A:
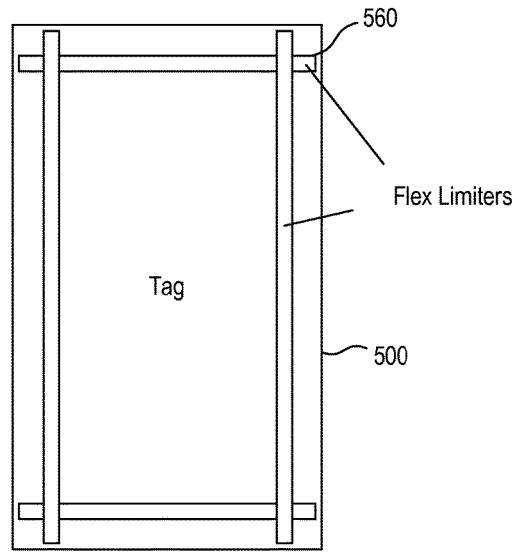
FIG. 5A is an illustration of front view of a display tag according to an embodiment.
Figure 5B:
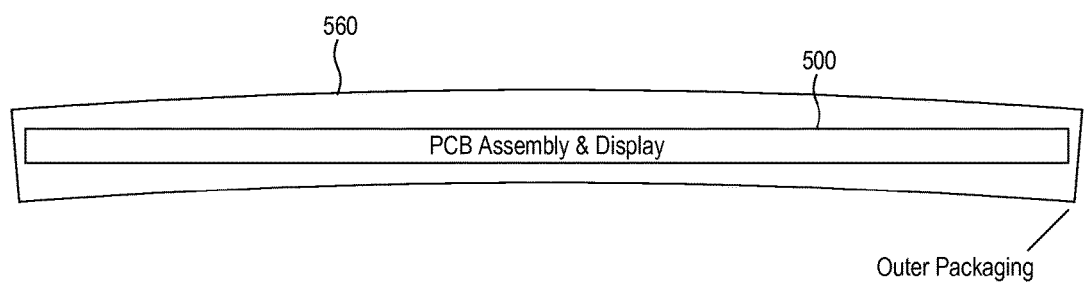
FIG. 5B is an illustration of a side view of the display tag show in FIG. 5A.

FIGS. 5A and 5B are illustrations of another embodiment of a display tag. Repeatedly flexing a display tag can present a challenge to maintaining the longevity of the display tag. Flexing can break conductors, films, pins, and solder joints. Referring to FIG. 5A, in any of the embodiments and instances described herein, a display tag, such as display tag 500, can include flexible packaging (shell) 560 (see FIG. 5B) and flex limiters 562. Flex limiters 562 can be mounted horizontally and/or vertically. In some instances, flex limiters 562 are spring rods mounted within the display tag 500. Flex limiters 562 can be for example solderably attached to a printed circuit board (PCB) (not shown in FIG. 5A). In some instances, it can be advantageous to make the packaging flexible while eliminating or minimizing the flex caused to the internal display, PCB, or circuitry. As an example, shell 560 can anchor the PCB assembly and display (shown as display tag 500 in FIG. 5B) at one or more points in a center region of the shell 560 and let shell 560 flex or bend around the PCB without flex to the PCB. In this manner, while the PCB assembly can be fixed relative to the center region of shell 560, the PCB assembly can float, i.e., not fixed, relative to end regions of shell 560. At a certain point, shell 560 can cause the PCB to flex but a flex radius of shell 560 can be smaller than a flex radius of the PCB, minimizing the stress on the PCB, display, and electronics. In any of the embodiments and instances described herein, the NFC device and the NFC chip can be connected to at least one coil that is resonated by at least one capacitor. In any of the embodiments and instances described herein, a display can be formed on a glass or plastic substrate.

Figure 6:
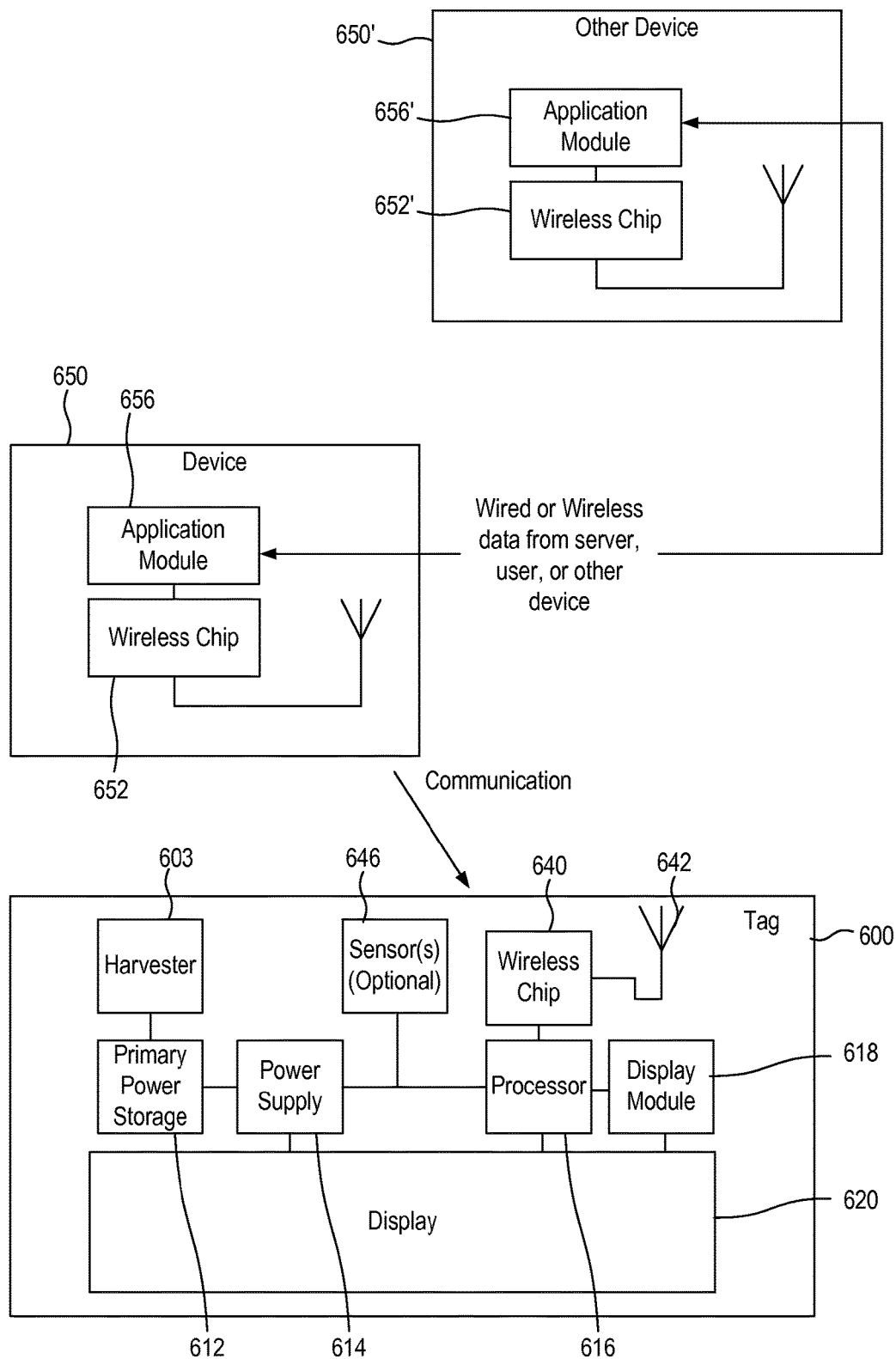
FIG. 6 is a schematic illustration of a display tag and NFC devices according to an embodiment

While the display tags described above with references to FIGS. 1-5B were shown as not including a battery, in some embodiments, a display tag can be battery powered and/or line powered. FIG. 6 is a schematic illustration of another embodiment of a display tag. As shown in FIG. 6, a display tag 600 includes a primary power storage 612, a power supply 614, a processor 616, a display module 618, a bi-stable display (display) 620, and a wireless chip 640. In some instances, display tag 600 can include a sensor 646 and/or harvester 603. Display tag 600 can be similar to and include similar components as display tag 100. By way of example, power supply 614 can be similar to power supply 114.

Display tag 600 can be configured to have a wireless interaction with a device 650, such as, for example, a wireless phone (e.g., a smartphone), tablet, etc. Device 650 includes a wireless chip 652 and an application module 656 configured to execute an application to modify an image displayed by display tag 600. In some instances, display tag 600 can communicate with device 650 using Bluetooth® communications. In some instances, display tag 600 can communicate with device 650 using Wi-Fi®, cellular, or other communication chips and protocols to wirelessly communicate between devices.

In some instances, display tag 600 is configured to operate for at least two to four years, or for 2500 display updates, from primary power storage 612. In some instances, primary power storage 612 can include a supercapacitor for supplying energy during peak current periods of operation of display tag 600. In some instances, power supply 614 is configured to condition the voltage and current of primary power storage 612. By way of example, power supply 614 can be a buck, boost, or buck-boost switching regulator. In some instances, power supply 614 can be by-passed with a lower-power power supply (not shown) configured to support the sleep current of display tag 400's electronics while using less energy. By way of example, power supply 614 can be a boost converter and a diode can be placed from and primary power storage 612 to an output of power supply 614. In such an example, power supply 614 can be disabled and primary power storage 612 can power the low current draw during microprocessor sleep through the diode.

Processor 616 can communicate with the wireless communications chip 640 to send and receive data. Processor 616 can interface with display module 618. Display module 618 can send the proper signals and voltages to display 620. In some instances, processor 616 can include display module 618. In some instances, processor 616 can receive data from sensor 646, for example, to determine a manner in which to operate display tag 600. In some instances, display tag 600 includes antenna 642 for communication with device 650. In some instances, display tag 600 can include a harvester 603 for recharging primary power storage 612. In some instances, primary power storage 612 includes a primary battery and a supercapacitor. In such an instance, harvester 603 can be used to recharge the supercapacitor. In such an instance, the primary energy source could be the supercapacitor and the battery could be used as a back up or when not enough energy was present from the harvesting. Harvester 603 can use solar, in-door photovoltaic, vibration, RF, induction, or any other type of energy.

Display tag 600 is configured to periodically send one or more radio transmissions to determine if device 650 is present (e.g. every ten seconds). If device 650 is not present, display tag 600 can sleep for a predetermined or programmable time period before again checking for the presence of device 650. If device 650 is present, display tag 600 can authenticate device 650 prior to receiving display tag 600 receiving data from application module 656 (e.g., application data) within device 650. In some instances, display tag 600 can be paired with one or more devices, such as device 650, to establish a secure communication link. Pairing can be performed by putting device 650 in discovery mode and pressing a button (not shown) on display tag 600. Device 650 can provide a key or user name and password to display tag 600 for authentication or vice versa. The button can be implemented as a mechanical button or as a capacitive touch button.

In some instances display tag 600 can operate in two or more modes. In a first mode, display tag 600 can use a communication method as describe above to determine if device 650 is present and if device 650 is a paired device. Once an authenticated device is identified, display tag 600 can switch to a second mode using a different communication method that is more advantageous for transferring high data rates (i.e. first communication mode may have a first data rate while second communication mode may have a second data rate higher than the first data rate). Display tag 600 can re-authenticate device 650 after switching to the second mode. As an example, display tag 600 can use Bluetooth® Low Energy (BLE) to periodically beacon and check for devices. If device 650 responds and is authenticated, device 650 and display tag 600 can negotiate switching to Classic Bluetooth® which supports higher data transfer rates. This can allow the application data to be transferred from device 650 to display tag 600 in less time. In certain applications, the two or more modes can use different communication protocols and can also use different hardware devices. As an example, the detection of device 650 be performed by display tag 600 using BLE and the data transfer can occur using a Wi-Fi® connection using a separate Wi-Fi® radio chip (not shown) in display tag 600 and in device 650.

Display tag 600 includes display 620. Display 620 is a bi-stable display that uses no energy (no applied voltage or supplied current) to maintain an image. The application data shown on display 620 can be an image, text, graphics, icon, or a combination of data. As an example, display 620 can show an image with text on top of it. For pictures, device 650 or display tag 600 can have the ability to dither the image. Dithering can smooth transitions between adjacent color or grayscale levels to remove apparent step changes on display 620.

Operationally, display tag 600 can be paired with one or more device, which may be cellular phones, tablets, computers, or other communicating devices. The display tag can store information about the paired devices. The display tag can reject access to non-paired devices. Display tag 600 can accept data from any paired device. The acceptance of the data may not require interaction from the user of the device beyond the original pairing of the display tag 600 to the device 650. The data may not be visible on the device by the user. In some instances, the user can be required to preview the data and approve the transfer of the data from the device 650 to the display tag 600. In some instances, the display tag 600 can be an open display tag meaning that any device can transfer data to display tag 600 without the need for pairing.

As shown in FIG. 6, device 650 includes application module 656. Application module 656 can store information about display tag 600 and other display tags (not shown) that are paired with device 650. Application module 656 can be configured to access a camera of device 650. Application module 656 can be configured to access information from a remote server using other communication techniques such as the cellular network, Wi-Fi® connection, or wired connection. Application module 656 can be configured to allow other devices to connect to display tag 600 through device 650. Application module 656 can be configured to pair different users of application module 656. As an example, and with reference to FIG. 6, a user of a device 650 may use a application module 656 to send a pairing request via the cellular, Wi-Fi®, or other connection to a user of a device 650' using an application module 656'. The pairing request can include information about the user of device 650, the device 650, the application module 656, and any associated display tags, including display tag 600, associated with the user of device 650. The user of device 650' can accept or reject the pairing request. If accepted, the pairing request can be classified as limited, full, or any other level of access. The pairing of device 650 to device 650' via application module 656 and application module 656' can allow the user of device 650 to send tag data from the device 650 to device 650'. In this manner, the user of device 650 can send data to the user of device 651' tag(s) and vice versa.

A cellular device with application module 656 installed can capture a picture using the cellular device's camera. As a specific example, User A and User B have paired application modules 656. User A can take a picture on their cellular phone using their application module 656. User A's application module 656 would send the picture over the cellular network or Wi-Fi® to User B's application module 656 running on their cellular phone. Application module 656 would send the picture to one of User B's tags where it could be displayed. In this manner, by way of example, family members can update pictures of themselves or of their kids at another family member's house.

Application modules can have different pairing classifications for different users. Application modules can have different pairing settings when sending or receiving information (a user can have access to another user's tags but may not allow that user to use their display tags). By way of example when information is sent by a first user to a second user, the second user does not need to launch application module or interact the device. For example, the display tag update occurs automatically and transparent to the user. In certain instances, the user can want to approve the data prior to sending the data to their display tag. If data is sent from User A to User B, and User B's device is not within range of their display tags, the image can be stored on the device and updates the User B's display tag once User B's device is in range.

In some instances, in an application module, a user can configure their application module to pass data to and from display tags that may or may not be associated with their device. This can allow display tags to still communicate without a paired user in range. As an example, a display tag may be setup to receive public service information from a server. If one or more users have an application module installed on their phone and have it configured for open push/pull of data, their phone can update the in range display tags. This concept also applies to display tags containing sensors. The sensor data could be pushed from the display tag through any open application within range back to a server.

In some instances, in an application module, a user can have more than one display tag. Paired users can have access to some or all of the display tags. In some instances, the application module can allow the user to view the user pairings of each display tag.

In some instances, device 650 and tag 600 can be securely paired. Tag 600 can provide a unique identification number to device 650 at the time of pairing. The unique identification number can be used as a key or seed in an encryption algorithm. In some instances, tag 600 can include an algorithm for converting data received from device 650 into a compatible image format for display module 618 to provide to display 620. In some instances, algorithms can be performed by processor 616. In some instances, data sent from device 650 to display tag 600 as a compressed image or an image generation file that can be smaller than the size of the image. In some instances, processor 616 can include an algorithm for bar code generation. In some instances, processor 616 can includes fonts for generating text on 620.

Figure 7A:
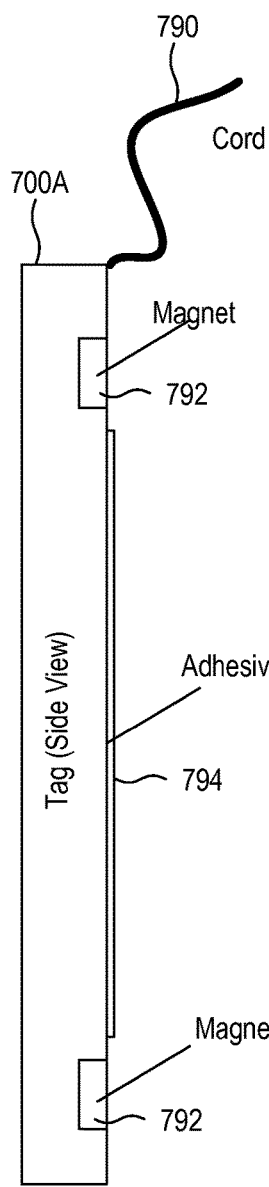
FIG. 7A is an illustration of a side view of a display tag according to an embodiment.
Figure 7B:
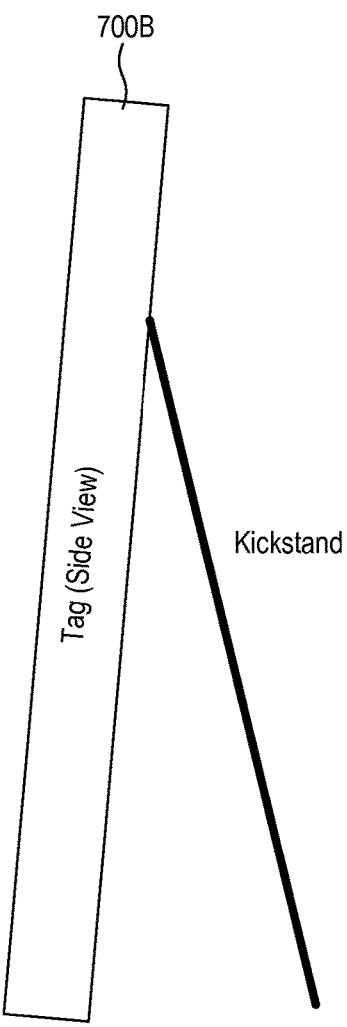
FIG. 7B is an illustration of a side view of a display tag according to an embodiment.
Figure 7C:
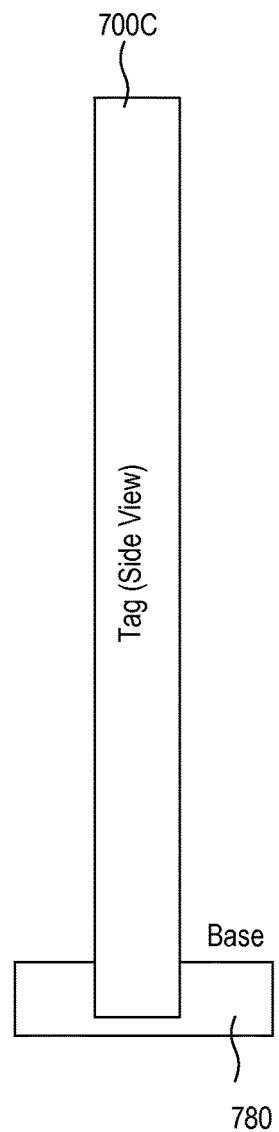
FIG. 7C is an illustration of a side view of a display tag according to an embodiment.

FIGS. 7A-7C are illustrations of side views of display tags according to different embodiments. Specifically, FIGS. 7A-7C depict different embodiments for mounting and or otherwise securing display tags. As shown in FIGS. 7A-7C, display tag 700A includes magnets 792 for mounting on ferromagnetic-metal-containing objects such as a refrigerator. Display tag 700A can include an adhesive strip 794 or backing for attachment on a surface such as a wall or on an object. Display tag 700A can include a cord, tie, or tether 790 for connection to a non-uniform or variable surface such as a suitcase, book bag, or other textile based object. While shown in FIG. 7A as including magnets 792, adhesive strip 794 and cord 796, in other instances, display tag 700a can have one of, or any combination of, magnets 792, adhesive strip 794 and cord 796. As shown in FIG. 7B, display tag 700B includes a mechanically rotatable kickstand 796 configured to allow display tag 700B to stand substantially upright on a surface. As shown in FIG. 7C, display tag 700C includes a permanently or removable base 780 configured to allow display tag 700C to stand substantially upright on a surface.

Figure 8A:
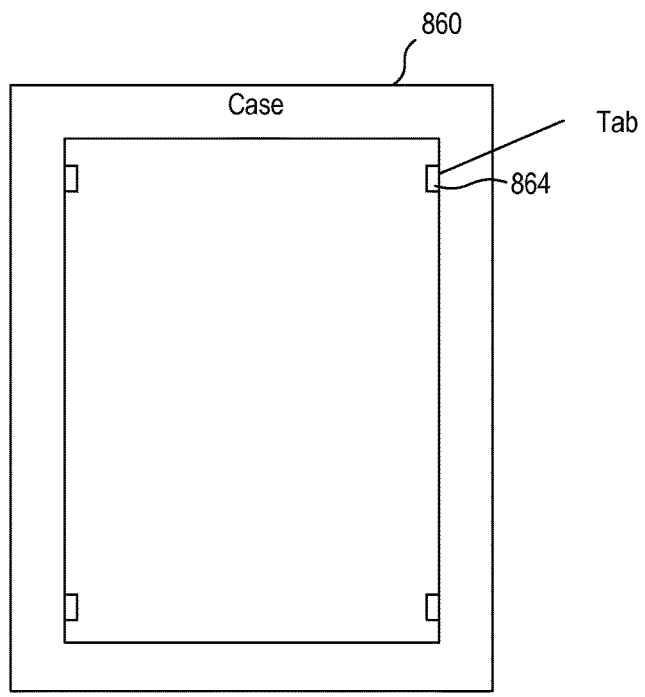
FIG. 8A is an illustration of a front view of a shell for a display tag according to an embodiment.
Figure 8B:
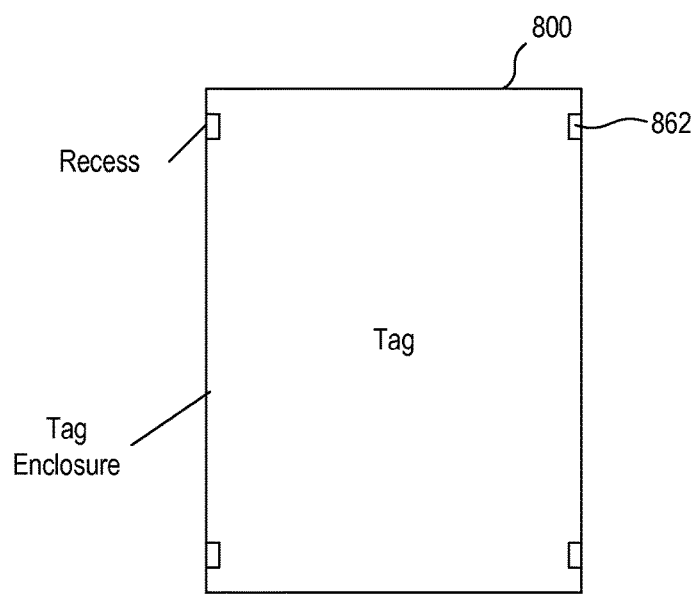
FIG. 8B is an illustration of a front view of a display tag according to an embodiment.

FIGS. 8A and 8B are illustrations of display tags according to other embodiments. As shown in FIGS. 8A and 8B, a display tag 800 includes one or more recesses 862 for accepting one or more tabs 864 from a removably attachable or non-removable case/shell (case) 860. Case 860 can be constructed of plastic, metal, wood, silicone, or other material. Case 860 can electrically or mechanically provide information to display tag 800 to set a mode of operation. By way of example, case 860 can set whether display tag 800 is in portrait mode or landscape mode. Case 860 can also provide settings such as the time between checking for a device (not shown), how long an image remains on the display (not shown) (can blank after a certain period of time), if display tag 800 should accept application data from any user, and any other display tag or device setting. Case 860 can contain additional power storage for connection to display tag 800 to provide extended lifetime. Case 860 can contain memory for storage of additional images. The images can be provided by the tag, loaded by the user using a computer, or come preloaded from the manufacturer into case 860 memory.

In some instances, a display tag enclosure can be a hard case or can be flexible including the features described herein. In some instances, the display tag can include a speaker or illuminated indicator for conveying information to the user. In some instances the display tag can contain a backlight for the display. The backlight can be user controlled or may automatically illuminate on image update for a predetermined or programmable time.

In some instances the display tag can have a cover to protect the display. In such instances, the cover can be a plastic material mechanically connected to the tag enclosure or the attachable case. The cover can be placed to have an air gap between the cover and the display. The air gap can allow the unit to flex without flexing the display. Additionally, the air gap can allow the cover to take a point impact on the center of the tag and not flex or impact the display. The cover can be removable and replaceable to allow the user to change the cover if the cover becomes damaged or scuffed. In some instances the display tag can include a touch panel over the display to allow user interaction.

In some instances the display tag can include one or more sensors for monitoring certain conditions of the display tag. As an example, in some instances the display tag can include a temperature sensor to monitor the temperature of the tag in order to adjust the parameters used to write the display. In some instances the display tag can also include a tilt or accelerometer sensor to determine the orientation of the display to correctly display the image with respect to the user. In some instances, the sensor data can be included as graphic data on the display. As an example, the current temperature can be listed on the display.

In some instances the display tag can have a predetermined or programmable section of the display used to show advertising. In some instances, the display tag can be configured to blank or go to a default image when the authorized device or devices are no longer in communications range with the tag. In some instances, communications between or from the display tag can be encrypted.

In some instances, the display tag can retain information about the authenticated or previous devices in a memory or a database. The retained information can be used to select the image to write to the display. As an example, in some instances, the display tag can display information such as advertising that is targeted toward the device or devices in range. In some instances, the display tag can also display the user name associated with the device in range. This functionality can be implemented using BLE advertising to learn information about the device. The images can be stored on the tag and selected using the information obtained from the device using the BLE communications protocol.

In some instances, the display tag can include a monochrome or color display or bi-stable display. In some instances, the display tag can include the ability to be recharged via energy harvesting or external wired connection such as USB. In some instances, the display tag can be configured to blank or go to a default image when a button on the tag is pressed or after a predetermined or programmable time period.

In some instances, the wireless communications can be replaced with a wired connection. The wired connection can be USB or other wired protocol. The wired protocol can be used to load one or more images into memory on the tag. The user can then use button on the display tag to select the image to display or can select a slide show mode that will periodically change the image sequentially or randomly at a predetermined or programmable time interval. As an example, the display tag can be mounted in a picture frame and hung on the wall. The user could load for example seven images to the display tag using USB and a personal computer. The display tag could change the image daily to provide a new picture every day of the week.

Figure 9A:
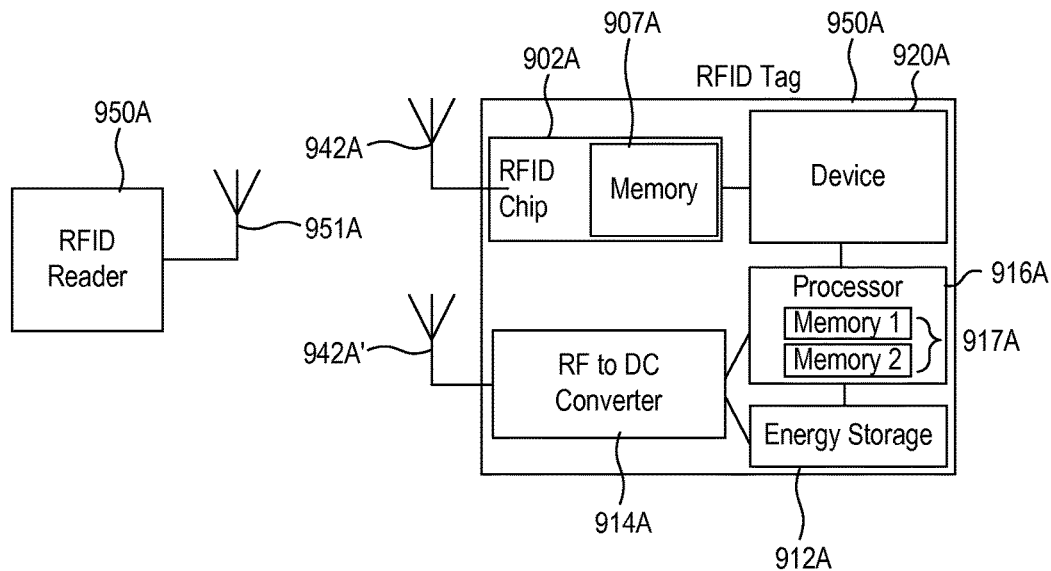
FIG. 9A is a schematic illustration of an RFID tag and RFID device according to an embodiment
Figure 11:
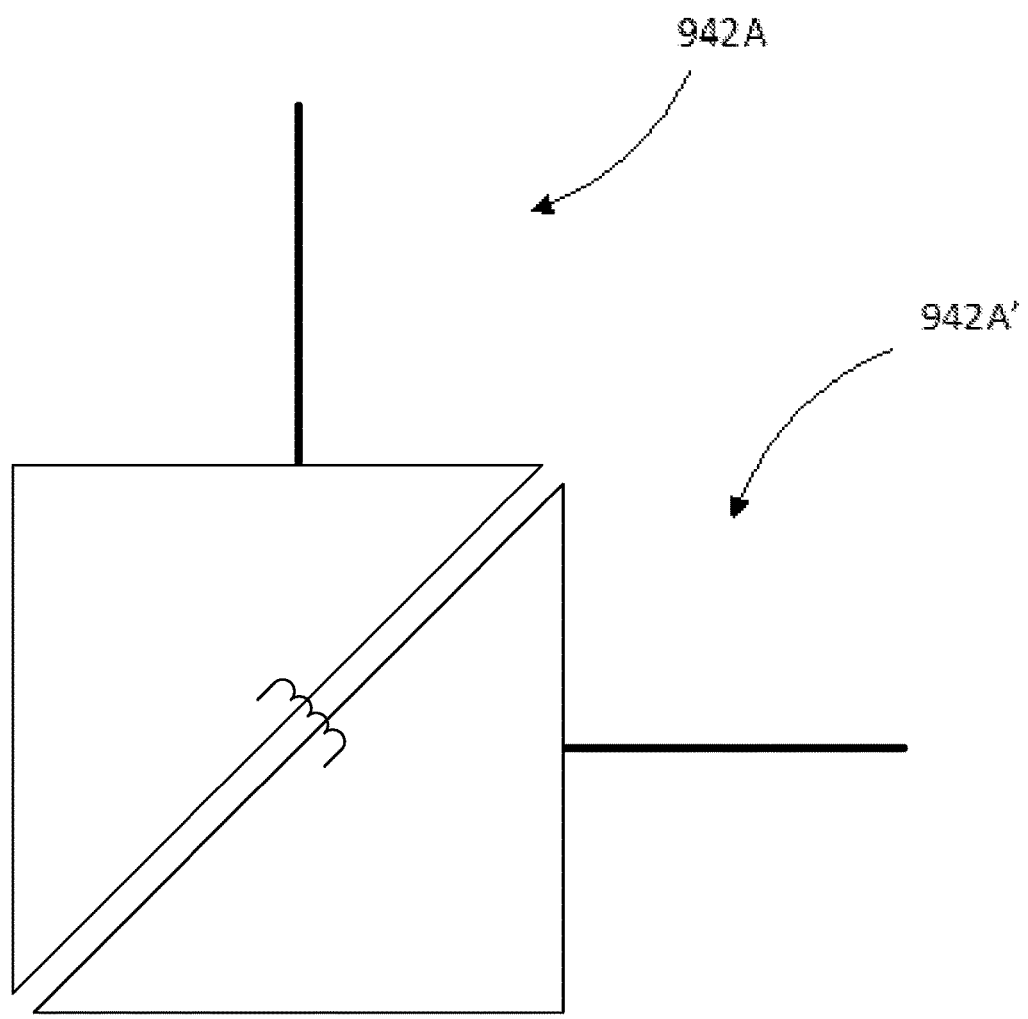
FIG. 11 is an illustration of a ground plane having an electrical split.

As shown in FIG. 9A, an RFID tag 900A includes first antenna 942A and second antenna 942A'. First antenna 942A can be connected to an RFID chip 902A configured to communicate via backscatter or load modulation to an RFID reader 950A via an RFID reader antenna 951A. RFID chip 902A can include one or more memories 907A for storing tag information (Electronic Product Code (EPC), tag ID, etc.) and user information (display information, temperature/humidity setting, etc.). The one or more memories 907A can be non-volatile. RFID tag 900A can include second antenna 942A' for connecting to an RF-to-DC converter 914A that can be configured to capture and store energy from RFID reader 950A in an energy storage device 912A such as a capacitor. In some instances, first antenna 942A can have an impedance that is a complex conjugate of an impedance of RFID chip 902A while second antenna 942A' can have an impedance that is a complex conjugate of an impedance of RF-to-DC converter 914A. In some instances, RF-to-DC converter 914A can be impedance matched with a standing wave ratio (SWR) of 2:1 over a power level range of at least 16 dB as described in U.S. Pat. No. 7,868,482, herein incorporated by reference in its entirety. In some instances, the optimum impedances of first antenna 942A and second antenna 942A' can be different. In one example, the first antenna 942A for RFID chip 902A can have an impedance close to 16+j150 ohms while second antenna 942A' for RF-to-DC converter 914A can have an impedance close to 50 ohms. In some instances, the scattering parameter S21 (S21) between first antenna 942A to second antenna 942A' is less than or equal to −6 dB such that isolation between first antenna 942A and second antenna 942A' can allow RFID chip 902A to backscatter energy to RFID reader 950A. If the isolation is poor, RF-to-DC converter 914A impedance can start to become in parallel with RFID chip 902A's modulated impedance, which can reduce the effectiveness of the modulation and thus the range of the backscatter communications. Isolation between first antenna 942A and second antenna 942A' can be achieved by spacing first antenna 942A and second antenna 942A' apart by a physical distance. In some instances, this physical distance is at least a quarter wavelength. In some instances, the polarization angle between first antenna 942A and second antenna 942A' can differ. In some instances, the polarization angle is at least pi divided by eight. In such instances, first antenna 942A and second antenna 942A' can also have different polarizations such as horizontal and vertical. In such an instance, the different antenna polarizations can be located in a way that one antenna is in a null of the other antenna. In such an instance, first antenna 942A and second antenna 942A' can share a common element in the same space to minimize the size of RFID tag 900A. As an example, first antenna 942A and second antenna 942A' can share a common ground plane. In such an example, first antenna 942A and second antenna 942A' can also share a common leg of a dipole. For example, first antenna 942A and second antenna 942A' share a common ground plane where the ground plane has an electrical split to isolate the RF currents from orthogonal antennas as shown in FIG. 11. At DC, however, the ground planes are electrically connected through one or more inductors, which act as RF chokes at the antenna frequency band.

Figure 9B:
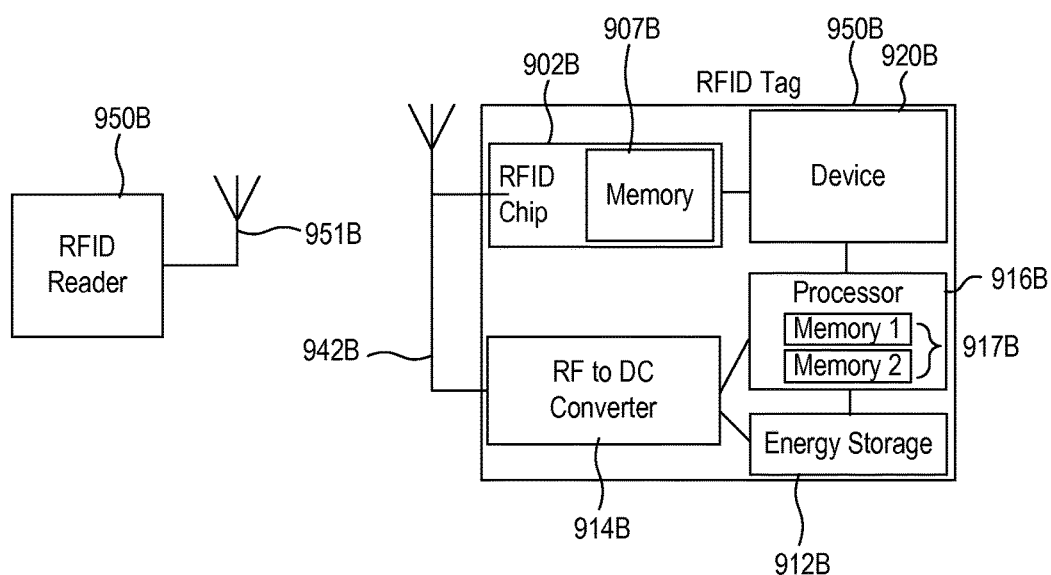
FIG. 9B is a schematic illustration of an RFID tag and RFID device according to an embodiment

Referring to FIG. 9B, an RFID tag 900B can use a single antenna 942B with multiple antenna ports (not shown). Each antenna port of antenna 942B can have a different impedance such that the impedance of an RFID chip 902B and an RF-to-DC converter 914B are properly or substantially matched. In some instances, S21 between the first antenna port to the second antenna port is less than or equal to −6 dB such that isolation between the antenna ports can allow RFID chip 902B on one antenna port to backscatter energy to an RFID reader 950B without significant impact from RF-to-DC convert 914B on the other antenna port. If the isolation is poor, RF-to-DC converter 914B impedance can start to become in parallel with RFID chip 902B's modulated impedance, which can reduce the effectiveness of the modulation and thus the range of the backscatter communications. In some instances, isolation between the antenna ports can be achieved by spacing the antenna ports apart by a physical distance. In such instances, this physical distance is at least a quarter wavelength. In some instances, the polarization angle between the antenna ports can be changed. In such instances, the polarization angle is at least pi divided by eight. In some instances, the antenna ports can also have different polarizations such as horizontal and vertical. In some instances, the antenna ports can share a common element in the same space to minimize the size of the RFID tag. In an example, the antenna ports can share a common ground plane (e.g., dual port, dual polarized patch antenna). In another example, the antenna ports can also share a common leg of a dipole. In some instances, a switch (not shown) can be used to provide isolation. In such an instance, the switch can be normally closed connecting antenna 942B to RF-to-DC converter 914B to allow an energy storage 912B to charge. In such an instance, once energy storage 912B is charged, a signal can be sent, for example, from a measuring device (e.g. comparator) (not shown), such that the switch can connect RFID chip 902B to antenna 942B to receive and transmit data to RFID reader 950B. In some instances, the switch can physically disconnect the load or de-tune the load to provide isolation. In some instances, other RF components can be used to provide isolation, such as a directional coupler. In some instances, the switching can be accomplished by presenting a DC short to and input of antenna 942B. A DC short can be accomplished using a MOSFET, or other switch, to ground through an RF choke. The RF choke can provide a high impedance at the RF frequency so antenna 942B is not affected by the RF impedance of the MOSFET. The choke is a DC short so the MOSFET can short the DC to ground and severally detune the rectifying harvester.

Referring to FIGS. 9A and 9B, with reference to FIG. 9A, RFID tag 900A can contain two or more memories that can operate independently. As an example, RFID chip memory 907A can be written by RFID reader 950A independent of whether a processor memory 917A is not powered and vice versa. Additionally, memory 917A of processor 916A can have non-volatile (EEPROM, Flash) memory to store values, such as the last state, when the power stored in energy storage 912A is insufficient to maintain the volatile memory (RAM) 917A of the microprocessor.

In normal operation, RFID reader 950A can write data into the non-volatile memory 907A of RFID chip 902A. At the same time, RF-to-DC converter 914A can charge energy storage 912A up to a voltage threshold level. Once the usage threshold level is reached, the processor 916A receives operational power as is described in more detail in U.S. Pat. No. 7,898,105, incorporated by reference herein in its entirety. Processor 916A runs or executes code that can be stored in and read from memory 907A of RFID Chip 902A. Processor 916A can also read its non-volatile memory 917A to obtain information about the current state of a device 920A. Based on RFID Chip memory 907A and microprocessor non-volatile memory 917A, processor 916A can interact with the device 920A. Device 920A can be a display or a sensor or any other device for obtaining or displaying information. In some instances, microprocessor 916A can provide a signal to RF-to-DC converter 914A, which can contain a DC-to-DC converter and other circuitry (not shown), such that providing energy to processor 916A from energy storage 912A can be stopped, e.g., processor 916A kills the supplied voltage. In this manner, any energy in energy storage 912A can be saved for operation at a future time. As an example, the device 920A can be a bi-stable display. RFID tag 900A can be in an RFID Reader field for an extended period of time and the display may be updated one or several times. Processor 916A can update the contents of the display if the image has changed. Therefore, shutting down the power immediately on this determination can allow energy storage 912A to reach the threshold quicker, which can allow processor 916A to more frequently check the status of RFID chip memory 907A.

Figure 10:
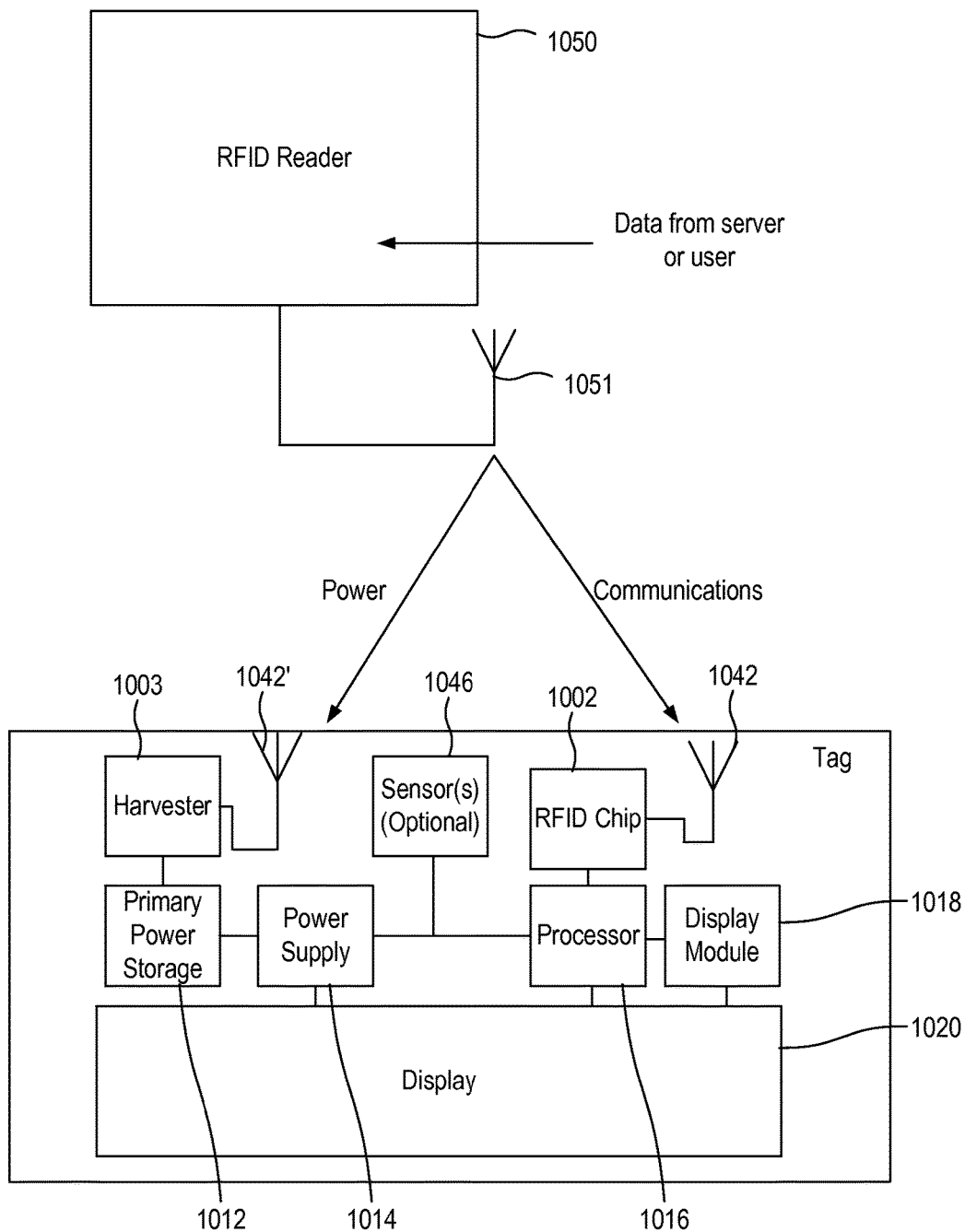
FIG. 10 is a schematic illustration of an RFID tag and RFID device according to an embodiment

FIG. 10 is a schematic illustration of another embodiment of an RFID tag. As shown in FIG. 10, an RFID tag 1000 includes an RFID chip 1002 that includes an antenna 1042, a harvester 1003 that includes an antenna 1042', a primary power storage 1012, a power supply 1014, a processor 1016, a display module 1018 and a bi-stable display 1020. RFID tag 1000 can be configured to have a RFID interaction with a RFID device 1050. RFID device 1050 includes an antenna 1051. RFID tag 1000 and RFID device 1050 can be similar to and include similar components as RFID tag 900A and RFID device 950A. By way of example, RFID chip 1002 can be similar to RFID chip 902A. As shown in FIG. 10, RFID tag 1000 can receive communications from antenna 1051 of RFID device 1050 via antenna 1042, but can receive power from antenna 1051 of RFID device 1050 via antenna 1042'. As shown in FIG. 10, RFID tag 1000 can include a sensor module 1046. Sensor module 1046 can include sensors and a sensor interface. The sensor interface can include one or more I2C and/or SPI ports, one or more analog to digital converters or channels, and/or other custom sensor interface. The sensor interface can be configured to measure resistance, capacitance, or voltage of a sensor.

In addition to the embodiments and instances described herein, elements of the devices described herein can include alternative and/or complimentary characteristics. In some instances, a display can be used as part of an antenna. In some such instances, a metal film of the display can be used as part of the antenna. Specifically, a portion of the display, for example a portion of the metal film of the display, can be used as at least a portion of a ground plane and/or a radiating element of an antenna. In some instances, a display construction can be designed to include the antenna within the display layers.

In some instances, an RFID tag can be flexible including the features described herein. In some instances, the RFID tag can be packaged by placing an RFID inlay between two or more sheets of lamination material. In such instances, the lamination material can contain an opening in which an LED, indicator, or display can be viewed through an additional layer of packaging. In some instances, the lamination process can be done in a roll-to-roll process. In some instances, the lamination can include printed text, graphics, bar codes, and other visual information. In some instances, the lamination can form a waterproof enclosure around the RFID inlay.

In some instances, a packaging, e.g., a shell, case, etc., can have an opening to allow sensor elements access to an environment outside the packaging. As an example, the packaging can have an opening to allow a humidity sensor to access the outside air. In other instances, the RFID tag can have ports for connection to external components or sensors.

In some instances, the RFID tag can have two or memories or memory types. In such instances, information updated infrequently can be stored in non-volatile memory. Similarly, memory that is updated frequently, such as once per second, can be stored in volatile memory. A display tag can be configured to power the volatile memory separately from other elements of the display tag. As an example, the display tag's power supply can charge a capacitor through a diode. In such an example, the capacitor can be connected to the volatile memory, which can have a low current draw, to provide enough voltage to maintain the memory while the RFID tag recharges from the reader. Once recharged, the display tag can take a new sample from the sensor and provide it to the volatile memory before shut down or running out of energy. During this time, the capacitor can be recharged through the diode. The capacitor can hold the voltage on the volatile memory so the reader can access the memory at any time while the RFID tag is in the RF field. In some instances, volatile memory can be advantageous because it can be written many more times than non-volatile memory with less damage than would occur to non-volatile memory after a certain number of writes.

In some instances, the RFID tag may have two or more user interfaces. The first interface can include a display. The second interface can be an LED, buzzer, tactile component, or other interface component for conveying information to the user such as that the RFID tag memory has been update or read.

In some instances, the RFID tag can have internal power storage such as a thin-film lithium battery or can be configured to interface with an external power storage. In some instances, the RFID tag can be non-rechargeable or rechargeable via an external recharging port.

In some instances, the RFID tag can include two or more substrates. A first substrate can be used to support the electronics chip(s) and antenna. A second substrate can be used to offset the RFID tag from the object it is mounted on to help maintain the impedance of the antenna. In such instances, the second substrate can have for example a dielectric constant of less than 2.25.

In some instances, the RFID tag can include a removable portion that can be detached. The detachable portion can be a sticker, label, or part of the RFID tag enclosure. In some instances, the detachable portion can be reattachable using a reattaching unit.

In any of the embodiments herein, the display can be a segmented or active matrix display. In some instances, the display can be a combination of displays.

In some instances, the RFID tag can include one or more digital flags that indicate to the reader that new data is available on the RFID tag or to the RFID tag that the reader has updated the memory on the RFID tag.

In some instances, the RFID tag can have a predefined or programmable sleep time or startup time. The sleep time from power on allows the sensors to stabilize prior to the processor reading the sensor data. In some instances, the RFID tag an also have a predefined or programmable sleep time or startup time between data logging events.

In some instances, the RFID tag can include a single chip containing one or more of the following: an integrated RFID communication block, a high efficiency RF-to-DC converter, a boost converter, a port for connection to an external capacitor or an on-chip capacitor or on-chip storage element, a processor or microcontroller or custom logic block, a display driver and/or sensor interface block, one or more ports for connection to one or more displays or one or more sensors, non-volatile memory, volatile memory, one or more antenna ports, and a port of connection to a battery (optional).

In some instances, the power converted from RF to DC can be shared between the RFID logic and the storage operation. The portion provided to the RFID logic and the portion provided to the power storage can vary with time. In such instances, portioning can be done sequentially or simultaneously.

In any of the embodiments and instances disclosed herein, a display tag can be waterproof (or substantially waterproof) and permanently or semi-permanently encased inside an enclosure, so as a case/shell disclosed herein. In some instances, the display tag can contain a permanent battery. The battery may not require maintenance over the useful life of the tag. In such instances, the battery may not be accessible by the user and can be permanently installed in the tag While various embodiments and instances described herein describe a particular number of antennas, storages and other elements of a display tag or NFC/RFID device systems described herein can include any number of such devices/elements, for example, to provide redundancy. While various embodiments and instances herein describe communication operation of a display tag as NFC, Bluetooth®, Wi-Fi® and/or RFID, they additionally include in the other communication embodiments.

While the embodiments and instances described herein use images and text/symbols as examples of display data to be displayed on display tags, in other embodiments and instances, display tags include a speaker for producing audio, alone or in combination with static or moving images and/or text. In such embodiments, wireless devices configured to send the display data to display tags can be configured to define, capture and/or record static images, moving images/video, audio, text/symbols, haptic signals (e.g., a vibration) etc. Similarly, in such embodiments and instances, a display tag can be configured to display such images/video/audio/vibrations, etc. In such an embodiments or instance, a speaker/vibration module could be powered and controlled in a manner similar to a display as described herein.

While various embodiments and instances of the invention are described herein, it should be understood that they have been presented by way of example only, and not limitation. Where methods described herein indicate certain events occurring in certain order, the ordering of certain events may be modified. Additionally, certain of the events may be performed concurrently in a parallel process when possible, as well as performed sequentially as described above.

In some embodiments and instances, the devices can include or relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments, instances and implementations are described herein as having particular features and/or combinations of components, other embodiments are possible having a combination of any features and/or components from any of the embodiments where appropriate.

I claim:

1. An apparatus comprising:
   a display module;
   a bi-stable display operatively coupled to the display module, the bi-stable display configured to display a first image at a first time;
   a near-field communications (NFC) module including an NFC chip and a first coil operatively coupled to the display module, the NFC chip configured to be wirelessly powered by an external NFC power supply associated with an external NFC device via the first coil;
   a harvester operatively coupled to the display module, the harvester including a second coil, the harvester configured to receive wireless power from the external NFC power supply via the second coil; and
   a maximum power point tracking (MPPT) circuit operatively coupled to the display module,
   the display module configured to receive, at a second time after the first time and in response to a near-field interaction with the external NFC device, (1) power from the external NFC power supply via the second coil and the MPPT circuit based on an output of the MPPT circuit and (2) a first signal from the NFC module indicative of a second image different from the first image, the first signal based on a second signal received by the first coil from the external NFC device,
   the bi-stable display configured to display, in response to receiving a third signal indicative of an instruction from the display module, the second image at a third time after the second time.

2. The apparatus of claim 1, further comprising:
   a power supply operatively coupled to a power storage,
   the power supply configured to begin supplying power to the bi-stable display from the power storage when a voltage level of the power storage crosses a first threshold.

3. The apparatus of claim 1, wherein
   the second coil is operatively coupled to the display module via a power supply.

4. The apparatus of claim 1, wherein:
   the display module is configured to receive power received by the second coil from the external NFC power supply via a filter and a power supply, and
   the NFC chip is configured to receive power received by the first coil from the external NFC power supply without passing through the filter or the power supply.

5. The apparatus of claim 1, wherein the bi-stable display is a first bi-stable display, the apparatus further comprising a second bi-stable display configured to display the first image at the first time and the second image at the third time.

6. The apparatus of claim 1, further comprising a flexible shell disposed about at least a portion of the bi-stable display, the bi-stable display operatively coupled to a central portion of the flexible shell, a flex radius of the flexible shell being less than a flex radius of the bi-stable display.

7. An apparatus comprising:
   a display module;
   a bi-stable display operatively coupled to the display module, the bi-stable display configured to display a first image at a first time;
   a radio-frequency identification (RFID) module including an RFID chip and a first antenna operatively coupled to the display module, the RFID module configured to be wirelessly powered by an external RFID power supply associated with an RFID device via the first antenna;
   a harvester operatively coupled to the display module, the harvester including a second antenna, the harvester configured to receive wireless power from the external RFID power supply via the second antenna; and
   a maximum power point tracking (MPPT) circuit operatively coupled to the display module,
   the display module configured to receive, at a second time after the first time and in response to an RFID interaction with the RFID device, (1) power from the external RFID power supply via the second antenna and the MPPT circuit based on an output of the MPPT circuit and (2) a first signal from the RFID module indicative of a second image different from the first image, the first signal based on a second signal received by the first antenna from the RFID device,
   the bi-stable display configured to display, in response to receiving a third signal indicative of an instruction from the display module, the second image at a third time after the second time.

8. The apparatus of claim 7, further comprising a flexible shell disposed about at least a portion of the bi-stable display, the bi-stable display operatively coupled to a central portion of the flexible shell, a flex radius of the flexible shell being less than a flex radius of the bi-stable display.

9. The apparatus of claim 7, further comprising a sensor module configured to monitor a condition of the bi-stable display.

10. The apparatus of claim 9, wherein:
    the condition is a temperature,
    the power supply is operatively coupled to a power storage,
    when the temperature is above a temperature threshold, the display module is configured to activate the bi-stable display after a voltage level of the power storage module crosses a first activation threshold, and
    when the temperature is below the temperature threshold, the display module is configured to activate the bi-stable display after the voltage level of the power storage module crosses a second activation threshold higher than the first activation threshold.

11. The apparatus of claim 7, further comprising a radio-frequency (RF)-to-direct-current (DC) converter operatively coupled to the second antenna.

12. The apparatus of claim 7, wherein:
    the second antenna is isolated from the first antenna by a distance of about one quarter wavelength.

13. The apparatus of claim 7, wherein:
    the RFID chip includes a first RF-to-DC converter; and
    the RF harvester includes a second RF-to-DC converter, the second RF-to-DC converter having a higher conversion efficiency than the first RF-to-DC converter.

* * * * *